United States Patent
Danford

(10) Patent No.: US 11,447,126 B2
(45) Date of Patent: Sep. 20, 2022

(54) PREEMPTIVE CHASSIS CONTROL INTERVENTION FOR AUTONOMOUS VEHICLE

(71) Applicant: GM Cruise Holdings LLC, San Francisco, CA (US)

(72) Inventor: Kevin Danford, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 692 days.

(21) Appl. No.: 16/264,578

(22) Filed: Jan. 31, 2019

(65) Prior Publication Data

US 2020/0247393 A1 Aug. 6, 2020

(51) Int. Cl.
| | |
|---|---|
| *B60W 30/02* | (2012.01) |
| *B60W 60/00* | (2020.01) |
| *B60W 30/18* | (2012.01) |
| *G05D 1/00* | (2006.01) |

(52) U.S. Cl.
CPC ...... *B60W 30/02* (2013.01); *B60W 30/18172* (2013.01); *B60W 60/001* (2020.02); *B60W 60/0015* (2020.02); *G05D 1/0088* (2013.01); *G05D 2201/0213* (2013.01)

(58) Field of Classification Search
CPC ............ B60W 30/02; B60W 30/0953; B60W 30/18172; B60W 30/09; B60W 60/0015; B60W 60/001; G05D 1/0088; G05D 2201/0213; B60T 8/1755
See application file for complete search history.

(56) References Cited

U.S. PATENT DOCUMENTS

| | | | |
|---|---|---|---|
| 8,204,667 B2 | 6/2012 | Joyce | |
| 9,796,421 B1 | 10/2017 | Gupta | |
| 9,868,332 B2 | 1/2018 | Anderson et al. | |
| 10,081,367 B2 | 9/2018 | Mangette et al. | |
| 10,589,738 B1* | 3/2020 | Boecker | B60T 8/17616 |
| 2008/0183353 A1* | 7/2008 | Post | B60T 8/17555 |
| | | | 701/42 |
| 2012/0109610 A1* | 5/2012 | Anderson | B60W 50/0098 |
| | | | 703/8 |
| 2016/0214645 A1* | 7/2016 | Owen | B60W 10/20 |
| 2016/0334790 A1 | 11/2016 | Rust et al. | |
| 2017/0015323 A1* | 1/2017 | Oguri | B60W 50/14 |
| 2019/0047527 A1* | 2/2019 | Falconer | B60W 40/068 |

* cited by examiner

*Primary Examiner* — Nadeem Odeh
(74) *Attorney, Agent, or Firm* — Calfee, Halter & Griswold LLP

(57) ABSTRACT

Described herein is a system and method for preemptive chassis control intervention for an autonomous vehicle having a mechanical system and a chassis controller. The chassis controller is configured to output a consumption signal that represents a percentage of an activation threshold consumed by an operation monitored by the chassis controller, wherein the chassis controller is activated to manipulate the mechanical system when the activation threshold is reached. A computing system of the autonomous vehicle receives the consumption signal output by the chassis controller to determine a path plan for the autonomous vehicle based upon the percentage of the activation threshold consumed by the operation monitored by the chassis controller. The computing system further controls the mechanical system to execute the path plan to preempt activation of the chassis controller.

18 Claims, 9 Drawing Sheets

PREEMPTIVE CHASSIS CONTROL INTERVENTION FOR AUTONOMOUS VEHICLE

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. The sensor signals are typically provided to a computing system in communication with the plurality of sensor systems, wherein the computing system outputs a control signal for controlling a mechanical system of the autonomous vehicle, such as a vehicle propulsion system, a braking system, or a steering system.

Additionally, the autonomous vehicle may include one or more chassis controllers, such as an antilock braking system (ABS), a traction control system (TCS), or an electronic stability control (ESC). The chassis controllers may be activated to manipulate operations of the mechanical systems independent of control signals output by the computing system. Activation of a chassis controller may be based upon an operation monitored by the chassis controller, such as wheel or vehicle stability, whereas a control signal may be output by the computing system to execute a path plan. Accordingly, execution of some control signals may cause a chassis controller to activate. For example, understeering on a low friction surface may cause the computing system to output a control signal for turning the wheels even farther in order to follow the path plan. However, execution of such a control signal may cause the ESC to activate when a more desirable action for the mechanical system is to countersteer the autonomous vehicle.

While a chassis controller can be incorporated in an autonomous vehicle to assist performance of maneuvers executed in accordance with control signals from the computing system, activation of a chassis controller may detrimentally impact passenger comfort, cause deviations from an identified path plan, and/or result in a degraded state of the autonomous vehicle. Moreover, chassis controllers are usually configured as independent systems from the computing system that generates the control signals for maneuvering the autonomous vehicle. As a result, chassis controllers typically do not communicate with the computing system to provide indications of an impending chassis controller activation; accordingly, conventional computing systems of autonomous vehicles commonly are unable to modify path plans or manipulation actuations of the mechanical systems based on impending chassis controller activation.

SUMMARY

The following is a brief summary of subject matter that is described in greater detail herein. This summary is not intended to be limiting as to the scope of the claims.

Described herein are various technologies pertaining to a system and method of preemptive chassis control intervention for an autonomous vehicle. With more specificity, described herein is a computing system that interfaces with a chassis controller to identify an impending chassis controller activation. With still more specificity, described herein is an autonomous vehicle comprising a mechanical system and a chassis controller in communication with a computing system of the autonomous vehicle. The computing system generates control signals to control actuation of the mechanical system. The chassis controller is activated to manipulate the actuation of the mechanical system when an activation threshold of the chassis controller is reached. Further, the chassis controller is configured to output a consumption signal that represents a percentage of the activation threshold consumed by an operation monitored by the chassis controller. The consumption signal output by the chassis controller is received by the computing system and a path plan for the autonomous vehicle is determined based upon the percentage of the activation threshold consumed by the operation monitored by the chassis controller specified by the consumption signal, wherein the mechanical system is controlled by the computing system to execute the path plan, for example, by manipulating brake pressure, brake torque, propulsion torque, steering angle, etc.

According to various embodiments, the chassis controller can comprise a processor and memory for determining the percentage of the activation threshold consumed by the operation monitored by the chassis controller and transmitting, from the chassis controller, the consumption signal indicative of the percentage of the activation threshold consumed by the monitored operation. In accordance with such embodiments, the chassis controller can be any of an ABS, a TCS, an ESC, amongst others. The chassis controller and the computing system may communicate with each other via a controller area network (CAN) bus incorporated in the autonomous vehicle.

The autonomous vehicle can include a plurality of chassis controllers, for example. Following this example, a first chassis controller, such as the ABS, can have a first activation threshold, a second chassis controller, such as the TCS, can have a second activation threshold, and a third chassis controller, such as the ESC, can have a third activation threshold. That is, the ABS is activated when the first activation threshold is reached, the TCS is activated when the second threshold is reached, and the ESC is activated when the third threshold is reached. Accordingly, the computing system determines from the consumption signal whether a percentage of the activation threshold of a particular chassis controller exceeds a preemptive action threshold. The preemptive action threshold represents the percentage of the activation threshold at which the path plan is modified to preempt activation of the chassis controller. Specifically, when the preemptive action threshold is exceeded, the path plan is modified at one or more impending timesteps, wherein modification of the path plan causes actuation of the mechanical system at the one or more impending timesteps to be manipulated to reduce the percentage of the activation threshold below the activation threshold of the particular chassis controller.

Additionally or alternatively, pursuant to various other embodiments, the activation threshold can be a variable threshold. The variable threshold is a threshold that may be modified by the chassis controller at periodic intervals based upon information provided by the computing system. For example, data input indicative of an environmental condition, vehicle speed, traffic congestion, etc. may be received by the computing system to manipulate the threshold at which the chassis controller is activated. A percentage of the variable threshold consumed by an operation monitored by the chassis controller is represented in a consumption signal received by the computing system, similar to the consumption signal received by the computing system generated for a fixed activation threshold.

In a further embodiment, it is contemplated that a surface friction can be identified for generating a path plan of the autonomous vehicle. In particular, the computing system is configured to receive data indicative of an actuation force of the mechanical system (e.g., a constant 500 Nm of brake force). An increase in the percentage of the activation threshold can be identified from the consumption signal, wherein the increase corresponds to a change in the percentage of the activation threshold over time. The surface friction may then be determined from the change in the percentage of the activation threshold over time and the data indicative of the actuation force of the mechanical system to control the mechanical system based upon the surface friction. Alternatively, the consumption signal can include data indicative of the surface friction, wherein the path plan may be determined based upon the data indicative of the surface friction.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
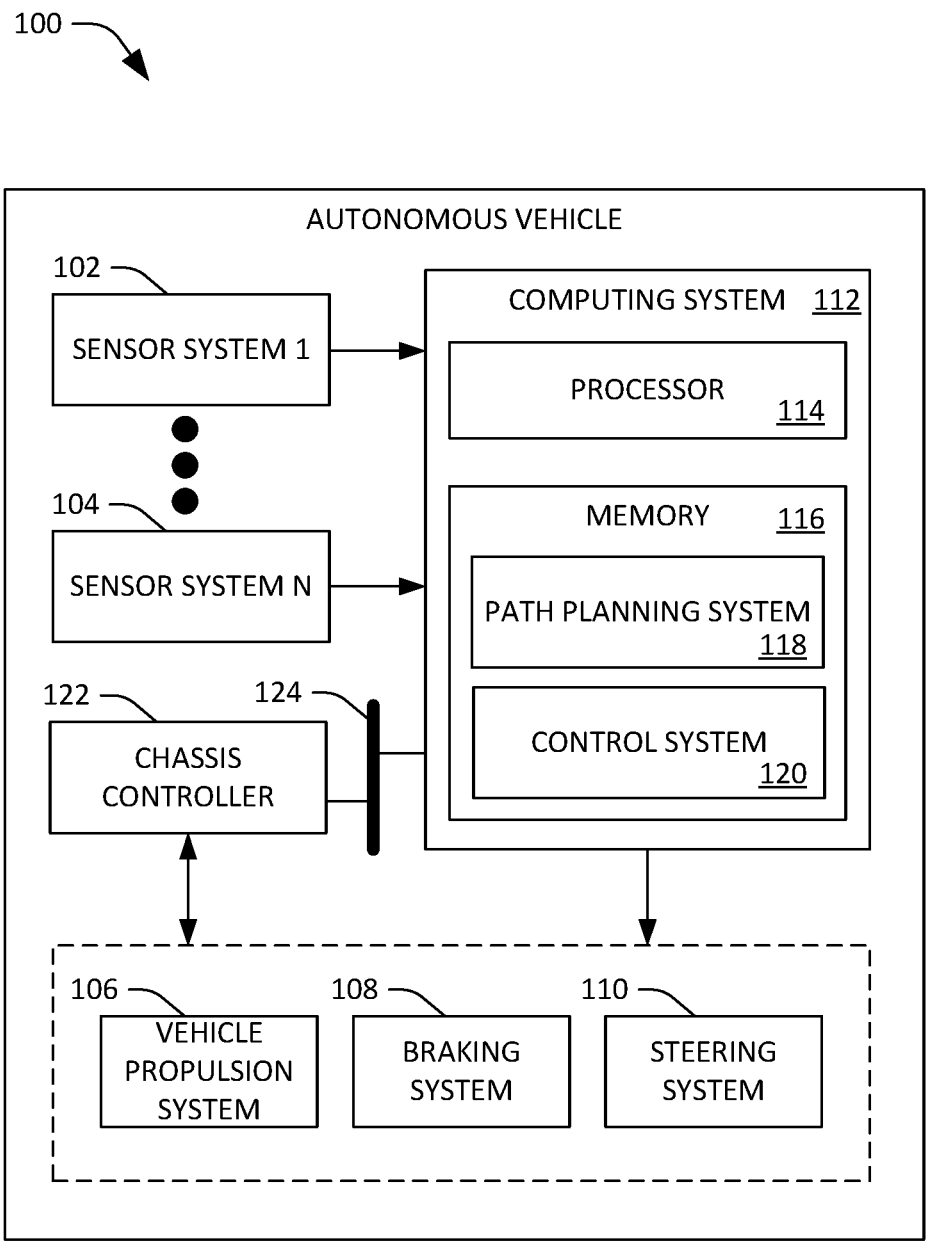
FIG. 1 illustrates an exemplary autonomous vehicle.

Various technologies pertaining to preemptive chassis control intervention for an autonomous vehicle is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, the term "exemplary" is intended to mean serving as an illustration or example of something and is not intended to indicate a preference.

Terms such as "first" and "second" are used herein. It is to be appreciated that these terms are used for purposes of identifying different items of the same kind (e.g., a first chassis controller and a second chassis controller), and are not necessarily meant to convey some sort of ordering or relative comparison between the different items.

With reference now to FIG. 1, an exemplary autonomous vehicle 100 is illustrated. The autonomous vehicle 100 can navigate about roadways without a human driver based upon sensor signals output by sensor systems 102-104 of the autonomous vehicle 100. The autonomous vehicle 100 includes a plurality of sensor systems 102-104 (a first sensor system 102 through an Nth sensor system 104). The sensor systems 102-104 are of different types and are arranged about the autonomous vehicle 100. For example, the first sensor system 102 may be a camera sensor system and the Nth sensor system 104 may be a lidar sensor system. Other exemplary sensor systems include, but are not limited to, radar sensor systems, global positioning system (GPS) sensor systems, inertial measurement units (IMU), infrared sensor systems, laser sensor systems, sonar sensor systems, and the like. Furthermore, some or all of the of sensor systems 102-104 may be articulating sensors that can be oriented/rotated such that a field of view of the articulating sensors is directed towards different regions surrounding the autonomous vehicle 100.

The autonomous vehicle 100 further includes several mechanical systems that can be used to effectuate appropriate motion of the autonomous vehicle 100. For instance, the mechanical systems can include but are not limited to, a vehicle propulsion system 106, a braking system 108, and a steering system 110. The vehicle propulsion system 106 may include an electric motor, an internal combustion engine, or both. The braking system 108 can include an engine break, brake pads, actuators, and/or any other suitable componentry that is configured to assist in decelerating the autonomous vehicle 100. The steering system 110 includes suitable componentry that is configured to control the direction of movement of the autonomous vehicle 100 during propulsion.

The autonomous vehicle 100 additionally includes a chassis controller 122 that is activated to manipulate the mechanical systems 106-110 when an activation threshold of the chassis controller 122 is reached. The chassis controller 122 is further configured to output a consumption signal that represents a percentage of the activation threshold consumed by an operation monitored by the chassis controller, such as brake pressure, brake torque, propulsion torque, steering angle, etc. In particular, the activation threshold can be represented as a normalized/non-dimensional value indicative of a current consumption of the activation threshold of the chassis controller 122. For example, if the current brake torque is at 50% of the activation threshold of the chassis controller 122, the normalized/non-dimensional value may be represented as 0.5. It is to be appreciated from the foregoing, however, that the claimed subject matter is not limited to a single chassis controller or a specific type of chassis controllers and that an additional number of chassis controllers or other types of chassis controllers may be incorporated in the autonomous vehicle 100 to manipulate actuation of the mechanical systems 106-110 when an activation threshold is reached.

The autonomous vehicle 100 further comprises a computing system 112 that is in communication with the sensor systems 102-104, the mechanical systems 106-110, and the chassis controller 122. While the chassis controller 122 is activated independently from operations of the computing system 112, the chassis controller 122 may be configured to communicate with the computing system 112, for example, via a controller area network (CAN) bus 124 to provide the consumption signal for preempting chassis controller activations. The computing system 112 includes a processor 114 and memory 116 that stores instructions which are executed by the processor 114 to cause the processor 114 to perform acts in accordance with the instructions.

The memory 116 comprises a path planning system 118 and a control system 120. The path planning system 118 generates a path plan for the autonomous vehicle 100, wherein the path plan can be identified both spatially and temporally according to one or more impending timesteps. The path plan can include one or more maneuvers to be performed by the autonomous vehicle 100. The chassis controller 122 can continuously calculate the percentage of the activation threshold consumed by an operation of the autonomous vehicle 100 based upon metrics such as vehicle speed, vehicle acceleration, wheel state, etc., wherein an intervention by the chassis controller 122 occurs when the percentage of the activation threshold represented in the consumption signal reaches a value of 100% or higher. The percentage of the activation threshold may likewise be represented on a scale of 0 to 1.0, wherein 1.0 is indicative of 100% of the activation threshold.

The consumption signal output by the chassis controller 122 is received by the path planning system 118 to determine, based upon the percentage of the activation threshold represented in the consumption signal, whether a current path plan should be modified. For instance, when the autonomous vehicle 100 transitions from a low mu surface to a higher mu surface, the percentage of the activation threshold represented in the consumption signal may increase (e.g., from 20% to 50%). When the percentage of the activation threshold exceeds a predetermined value (e.g., 50% consumption of the activation threshold) as a result of the change in surface mu, the path planning system 118 can evaluate the current path plan in one or more impending timesteps, where projected actuations of the mechanical systems 106-110 are preplanned, to determine whether execution of the current path plan can continue without an intervention from the chassis controller 122 or whether a modified path plan is desirable for the autonomous vehicle 100 to avoid an intervention from the chassis controller 122. Projected actuations of the mechanical systems 106-110 can be based upon the percentage of the activation threshold in relation to the timesteps as well as an actuator request derivative.

In an example, if actuation of the braking system 108 causes a constant brake force of 500 Nm during a time period that the percentage of the activation threshold increased from 20% to 50%, the path planning system 118 can identify that the surface friction has decreased. Thus, the path planning system 118 can evaluate projected actuations of the mechanical systems 106-110 at the timestep+1, the timestep+2, etc., to determine if preplanned actuations will continue to increase the percentage of the activation threshold toward 100%. If so, the path planning system 118 may determine that the path plan can be modified in a manner that facilitates a reduction in brake pressure, which can reduce the percentage of the activation threshold consumed by operation of the braking system 108. Otherwise, the path planning system 118 may leave the current path plan unmodified. While the foregoing example describes preemptive controls for the braking system 108, manipulation of the mechanical systems 106-110 to avoid a chassis controller intervention based upon a consumption signal is not limited to a specific type of chassis controller 122.

The control system 120 is configured to control the mechanical systems of the autonomous vehicle 100 (e.g., the vehicle propulsion system 106, the brake system 108, and the steering system 110) based upon an output from the sensor systems 102-104 and/or the path planning system 118. For instance, the mechanical systems can be controlled by the control system 120 to execute the path plan determined by the path planning system 118. Additionally or alternatively, the control system 120 may control the mechanical systems 106-110 to navigate the autonomous vehicle 100 in accordance with outputs received from the sensor systems 102-104.

Figure 2:
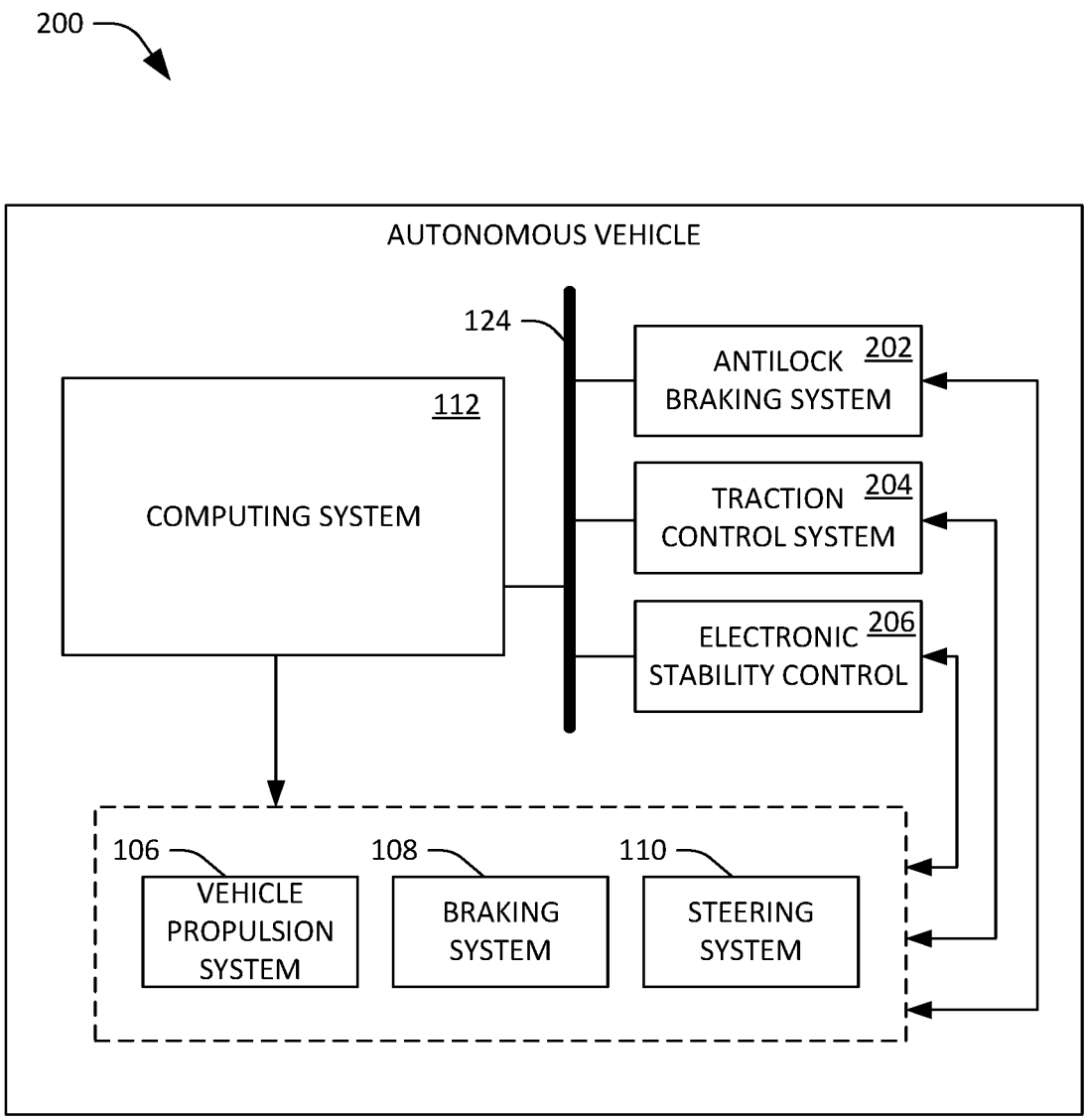
FIG. 2 illustrates an exemplary autonomous vehicle including a plurality of chassis controllers.

With reference now to FIG. 2, the autonomous vehicle 200 may comprise a plurality of chassis controllers 202-206, which can include an antilock braking system (ABS) 202, a traction control system (TCS) 204, and an electronic stability control (ESC) 206. The ABS 202 and the TCS 204 are activated to manipulate longitudinal movement and the ESC 206 is activated to manipulate lateral movement when their respective activation thresholds are reached. For example, the ABS 202 can be activated to reduce brake pressure from the braking system 108 to avoid locking or skidding the wheels when a brake torque is identified that may cause the surface friction of the road to be exceeded. Similarly, the TCS 204 can be activated to reduce propulsion torque from the vehicle propulsion system 106 or increase brake torque from the braking system 108 when a propulsive torque is identified that may cause the surface friction of the road to be exceeded. The ESC 206 can be activated to manipulate the steering system 110 when the yaw error between the autonomous vehicle 200 and the steering angle causes undesirable oversteering or understeering. Activation of the ESC 206 may further result in increasing the brake pressure from the braking system 108 to stabilize lateral movement of the autonomous vehicle 200. Thus, the mechanical systems 106-110 may cause data to be generated for the chassis controllers 202-206 that is indicative of actuation of the mechanical systems 106-110 and the chassis controllers 202-206 may control the mechanical systems 106-110 based upon the generated data.

The chassis controllers 202-206 are each configured to output a consumption signal that represents a percentage of their respective activation thresholds consumed by one or more operation monitored by the chassis controllers 202-206, such as brake pressure, brake torque, propulsion torque, steering angle, etc. For example, the ABS 202 may have a first activation threshold, the TCS 204 may have a second activation threshold, and the ESC 206 may have a third activation threshold, wherein the ABS 202 is activated when the first activation threshold is reached, the TCS 204 is activated when the second threshold is reached, and the ESC 206 is activated when the third threshold is reached.

A computing system 112 of the autonomous vehicle 200 is in communication with the chassis controllers 202-206 via a CAN bus 124. The CAN bus 124 may communicate one or more consumption signals from the chassis controllers 202-206 to the computing system 112. The computing system 112 is likewise configured to control the mechanical systems 106-110 based upon the percentage of the activation threshold represented in the consumption signal to preempt activation of the chassis controllers 202-206.

Figure 3:
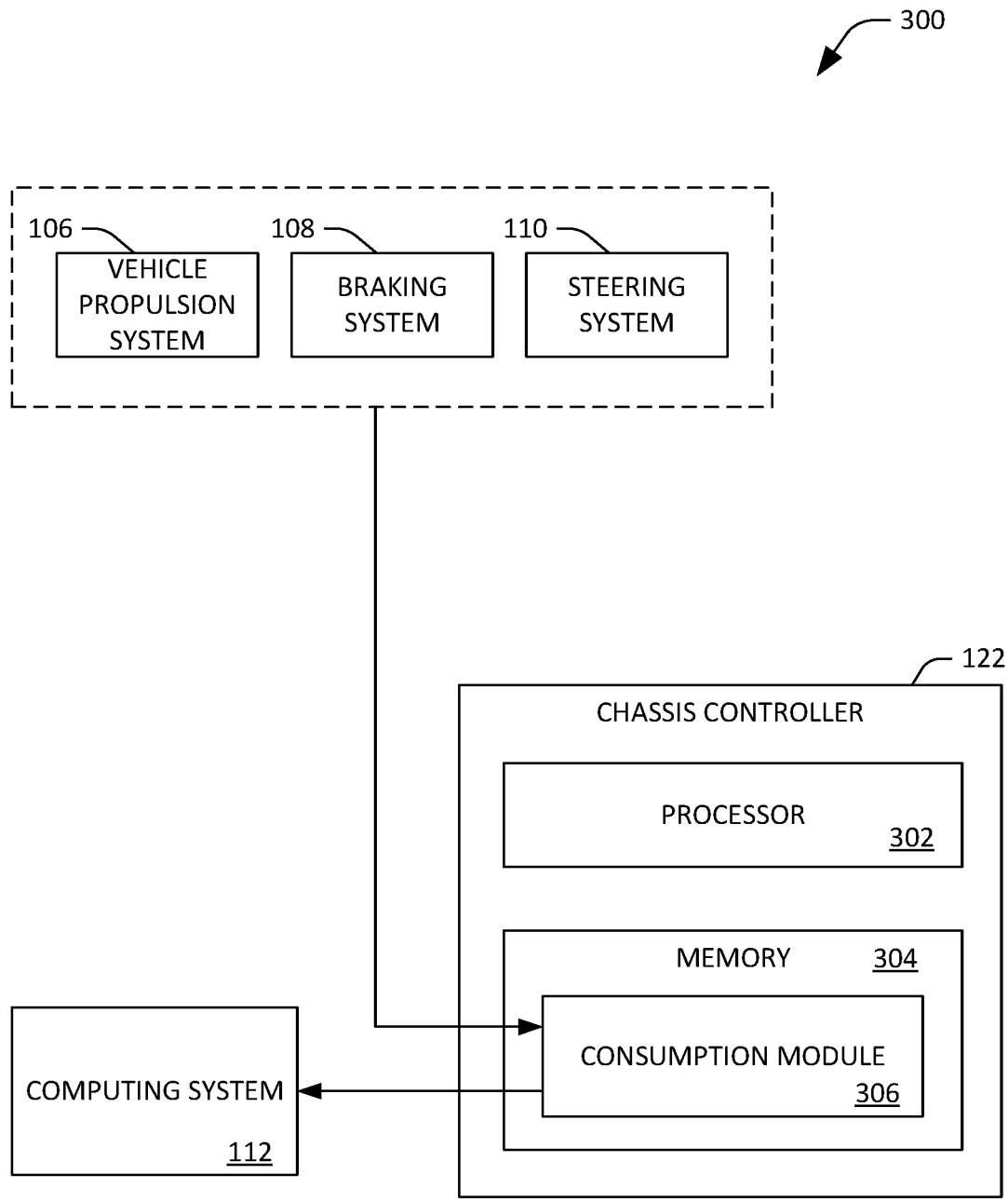
FIG. 3 illustrates an exemplary environment including a chassis controller that outputs a consumption signal to a computing system based upon operations monitored by the chassis controller.

With reference now to FIG. 3, environment 300 illustrates a chassis controller 122 that receives data indicative of operations of the mechanical systems, such as the vehicle propulsion system 106, the braking system 108, and/or the steering system 110, and outputs a consumption signal to the computing system 112 based upon the data. The chassis controller 122 includes a processor 302 and memory 304 that stores instructions which are executed by the processor 302 to cause the processor 302 to perform acts in accordance with the instructions. In particular, memory 304 comprises a consumption module 306 configured to determine a percentage of an activation threshold consumed by an operation monitored by the chassis controller, such as brake pressure, brake torque, propulsion torque, steering angle, etc., wherein the chassis controller is activated when the activation threshold is reached. For example, if the autonomous vehicle passes over a low mu surface, such as a wet manhole cover, while a constant brake torque is being applied by the braking system 108, rapid angular deceleration of the wheel may be indicative of a change in surface friction that causes the chassis controller 122 to activate. The consumption module 306 is configured to identify the percentage of the activation threshold, for example, based upon the rate of angular deceleration of the wheel and transmit, from the chassis controller, a consumption signal indicative of the percentage of the activation threshold to computing system 112.

Figure 4:
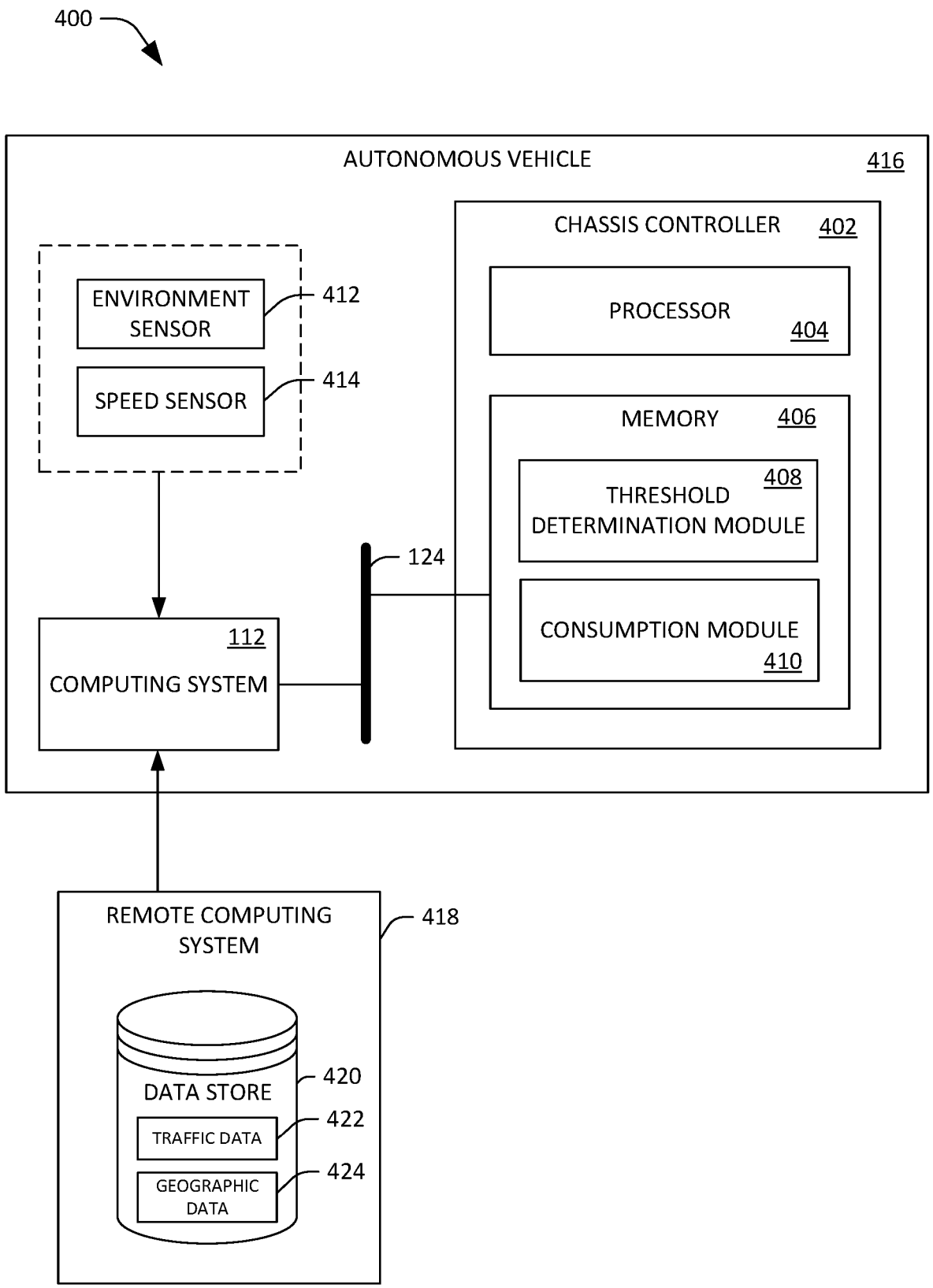
FIG. 4 illustrates an exemplary environment including a chassis controller that establishes a variable threshold based upon inputs provided to a computing system.

With reference now to FIG. 4, environment 400 illustrates a chassis controller 402 (e.g., the chassis controller 122) that determines an activation threshold, wherein the activation threshold can be a variable threshold based upon one or more inputs provided to a computing system 112. For instance, the variable threshold may be based upon inputs indicative of environmental conditions, vehicle speed, traffic congestion, geographic data, amongst others. Some of the inputs may be received by the computing system 112 from sensors incorporated in the autonomous vehicle 416, such as an environment sensor 412 that senses environmental conditions around the autonomous vehicle 416 (e.g., snow, rain, ambient temperature, etc.) and/or a speed sensor 414 that senses the speed of the autonomous vehicle 416. Additionally or alternatively, inputs received by the computing system 112 may be provided from a data store 420 of a remote computing system 418. The data store 420 can include traffic data 422 that identifies, for example, current or historical data indicative of traffic congestion as well as geographic data 424 that can be indicative of current or historical weather patterns for a specified geographic area. Accordingly, inputs received by the computing system 112 may be provided to the chassis controller 402 over the CAN bus 124 for the chassis controller 402 to determine a variable threshold based upon the inputs.

The chassis controller 402 includes a processor 404 and memory 406 that have similar functionality to the processor 302 and memory 304. Memory 406 includes a threshold determination module 408 and a consumption module 410. The threshold determination module 408 is configured to determine an activation threshold for the chassis controller 402 based upon information received via the CAN bus 124. Specifically, the activation threshold may be a variable threshold that is periodically modified by the chassis controller 402 based upon the information provided by the computing system 112. For example, if the threshold determination module 408 is provided with information indicative of weather conditions that are 85 degrees and sunny, the threshold determination module 408 can establish a higher activation threshold for a chassis controller 402, such as an ABS, than may otherwise be established if weather conditions were identified as 20 degrees and snowing. The consumption module 410 is configured to identify a percentage of the variable threshold consumed by an operation monitored by the chassis controller 402, such as braking, and generate a consumption signal that represents the percentage of the variable threshold. The consumption signal representing the percentage of the variable threshold is received by the computing system 112 over the CAN bus 124.

In an exemplary embodiment, the activation threshold may be represented as a fixed threshold and the percentage of the activation threshold at which the mechanical systems are controlled to preempt an intervention by the chassis controller 402 may be varied by the computing system 112. For example, if the computing system 112 receives an input indicative of weather conditions that are 85 degrees and sunny, the computing system 112 may determine that the percentage of the activation threshold consumed by an operation of the autonomous vehicle 416 can reach 75% before preemptive action is needed. In contrast, if the computing system 112 receives an input indicative of weather conditions that are 20 degrees and snowing, the computing system may determine that preemptive action is desirable at 30% consumption of the activation threshold.

Figure 5:
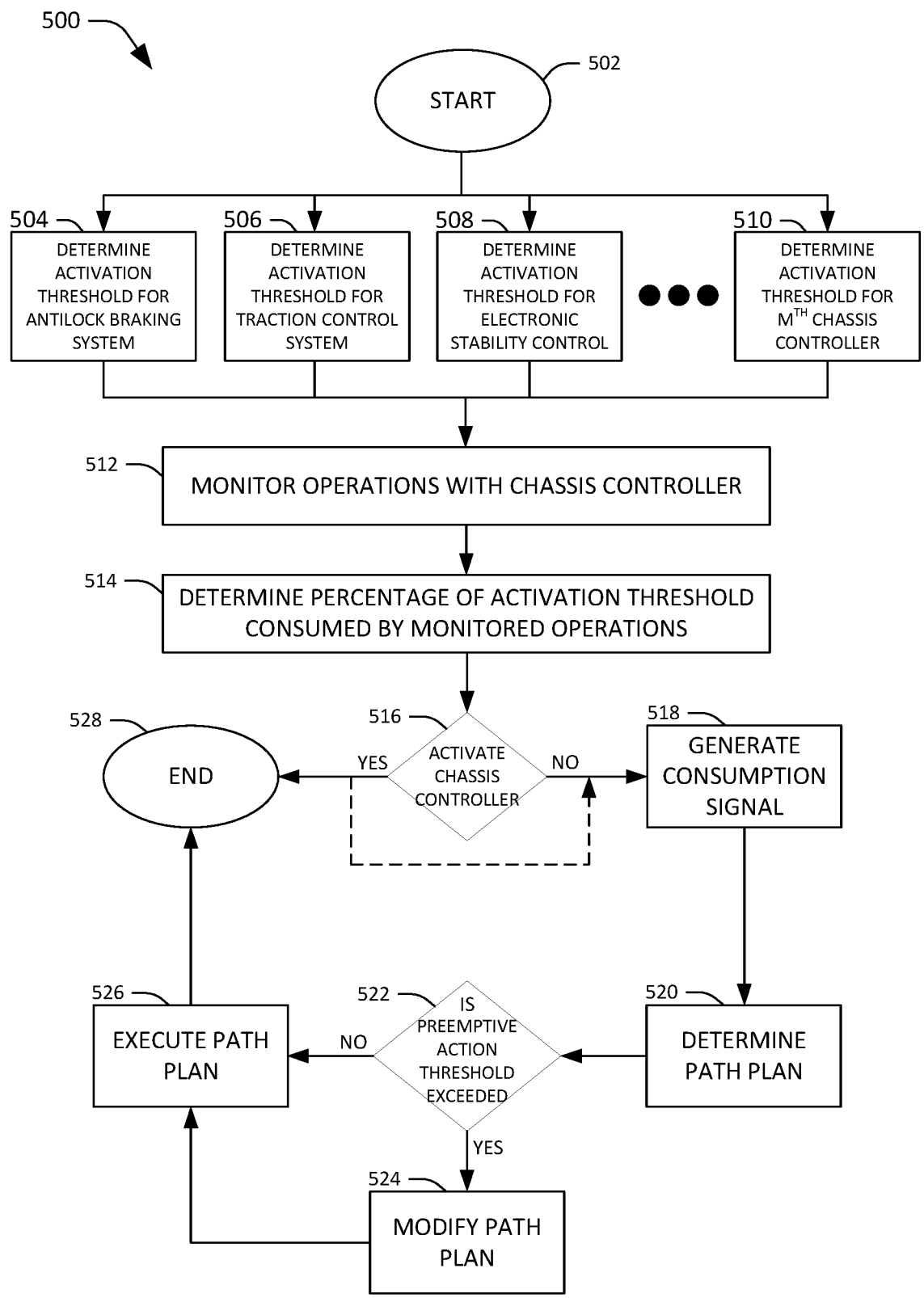
FIG. 5 is an exemplary flow diagram illustrating preemptive chassis controller intervention.

With reference now to FIG. 5, an exemplary flow diagram 500 illustrates preemptive chassis control intervention. The flow diagram 500 starts at 502, and at 504-510 activation thresholds are determined for a plurality of chassis controller types. Specifically, a first activation threshold is determined for the ABS at 504, a second activation threshold is determined for the TCS at 506, a third activation threshold is determined for the ESC at 508, and an Mth activation threshold is determined for an Mth chassis controller type at 510. At 512, operations of an autonomous vehicle are monitored by the chassis controllers. The operations can be based upon brake pressure, brake torque, propulsion torque, steering angle, and the like. At 514, a percentage of the activation threshold consumed by the operations monitored by the chassis controllers is determined. A different percentage of the activation threshold may be determined for each of the chassis controllers.

At 516, the chassis controller is activated when the percentage of the activation threshold reaches 100%, wherein the flow diagram 500 may complete at 528. Alternatively, the chassis controller does not activate at 516 when the percentage of the activation threshold is less than 100%. Instead, a consumption signal is generated at 518 that represents the percentage of the activation threshold consumed by the operation monitored by the chassis controller. Additionally, a consumption signal may be generated at 518 even when the chassis controller is activated at 516 that represents a percentage of the activation threshold of 100% or greater.

The consumption signal generated at 518 may be provided to a computing system of an autonomous vehicle where, at 520, a path plan can be determined for the autonomous vehicle. The path plan represents spatial and temporal positions of the autonomous vehicle at one or more impending timesteps. At 522, it is determined from the consumption signal whether the percentage of the activation threshold exceeds a preemptive action threshold. A preemptive action threshold is a threshold that represents the percentage of the activation threshold at which the path plan is modified to preempt activation of the chassis controller. When the preemptive action threshold is exceeded by the percentage of the activation threshold, the path plan is modified, at 524, at the one or more impending timesteps, wherein modification of the path plan causes actuation of the mechanical system at the one or more impending timesteps to be manipulated. The modified path plan is executed at 526. If the percentage of the activation threshold does not exceed the preemptive action threshold, the current/unmodified path plan determined at 520 is executed at 526. The flow diagram 500 completes at 528 upon execution of a path plan at 526.

Figure 6:
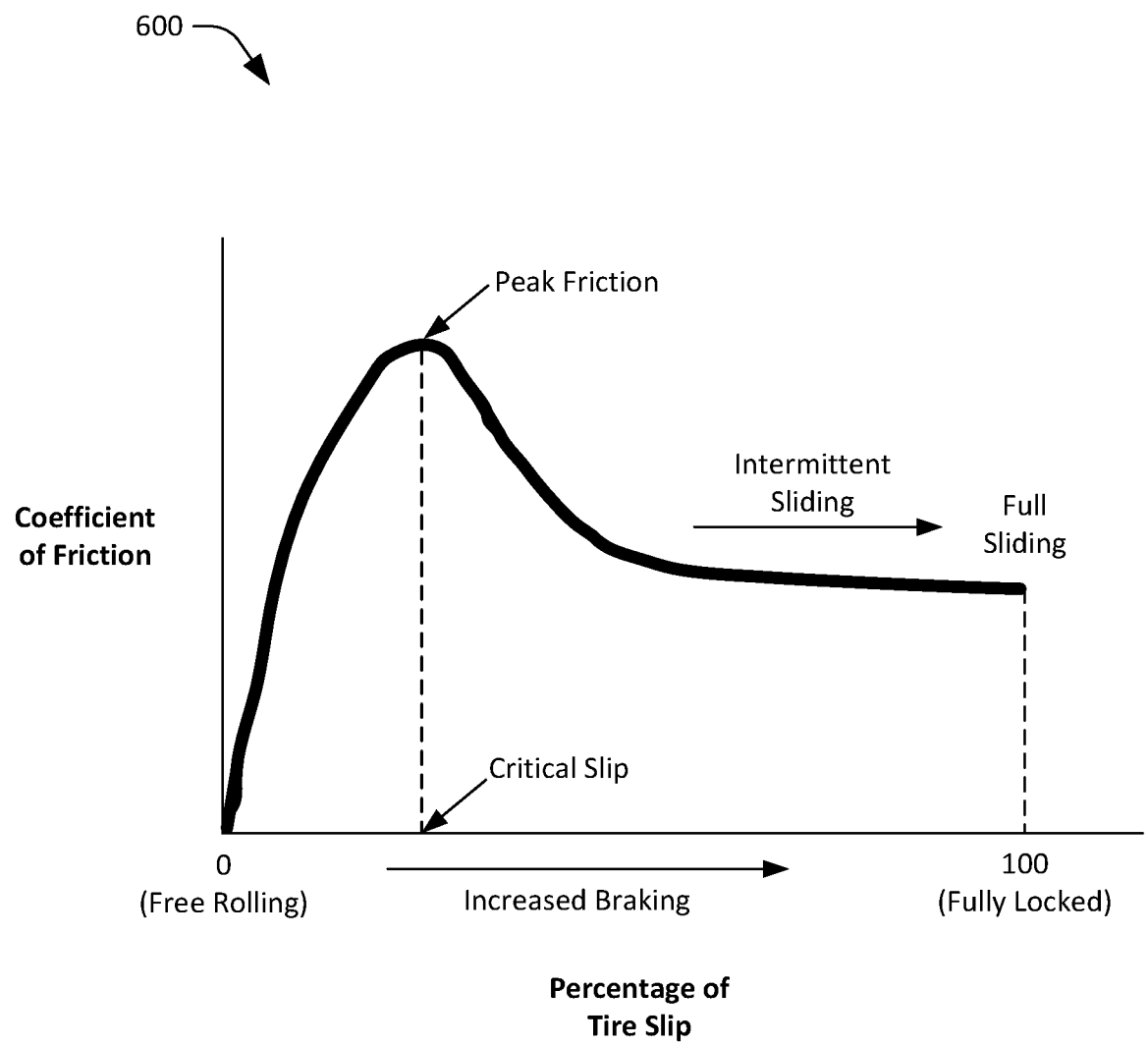
FIG. 6 illustrates an exemplary tire mu slip curve.

With reference now to FIG. 6, an exemplary tire mu slip curve 600 is illustrated, wherein peak friction corresponds to a critical slip value indicative of actuation of the braking system. Accordingly, a chassis controller may be configured to output a consumption signal that includes data indicative of a surface friction by detecting a percentage of tire slip and correlating the percentage of tire slip to the exemplary tire mu slip curve 600. The data indicative of the surface friction may be received by a computing system to determine a path plan for an autonomous vehicle by utilizing the identified surface friction data to avoid activation of the chassis controller.

In instances where the chassis controller is not configured to provide the computing system with a projected surface friction, the surface friction may still be determined for controlling the mechanical systems of the autonomous vehicle based upon a change in the percentage of the activation threshold over time and data indicative of an actuation force of the mechanical systems. That is, the computing system can receive data indicative of an actuation force applied by the mechanical system, such as 500 Nm of brake force, and further identify an increase in the percentage of the activation threshold represented in the consumption signal, wherein the increase corresponds to a change in the percentage of the activation threshold over time. Since a chassis controller, such as an ABS, may be configured to activate at or near the peak of the exemplary tire mu slip curve 600, identifying the brake force and a slope that corresponds to the change in the percentage of the activation threshold over time provides a basis for projecting the surface friction and manipulating the path plan of the autonomous vehicle.

Figure 7:
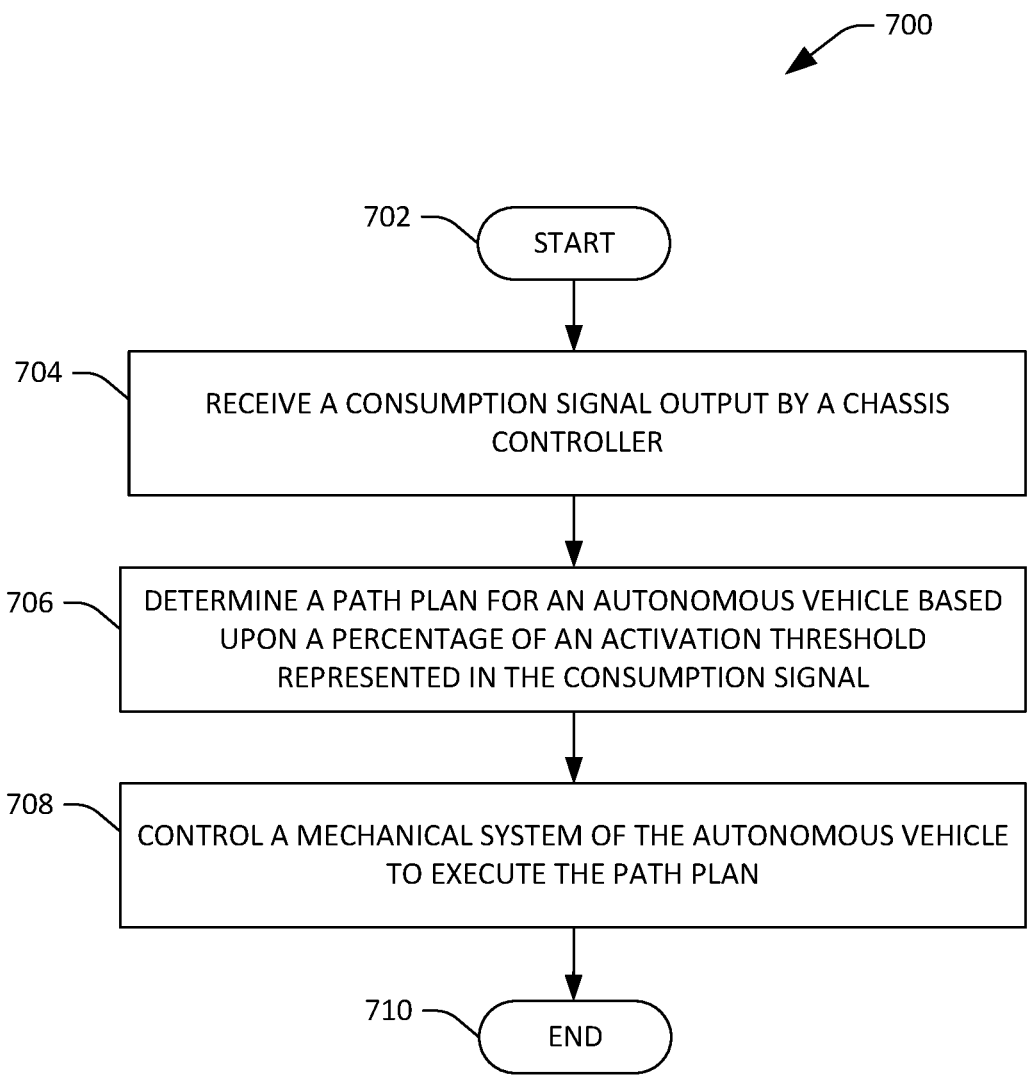
FIG. 7 is a flow diagram illustrating an exemplary methodology for controlling a mechanical system based upon a consumption signal.
Figure 8:
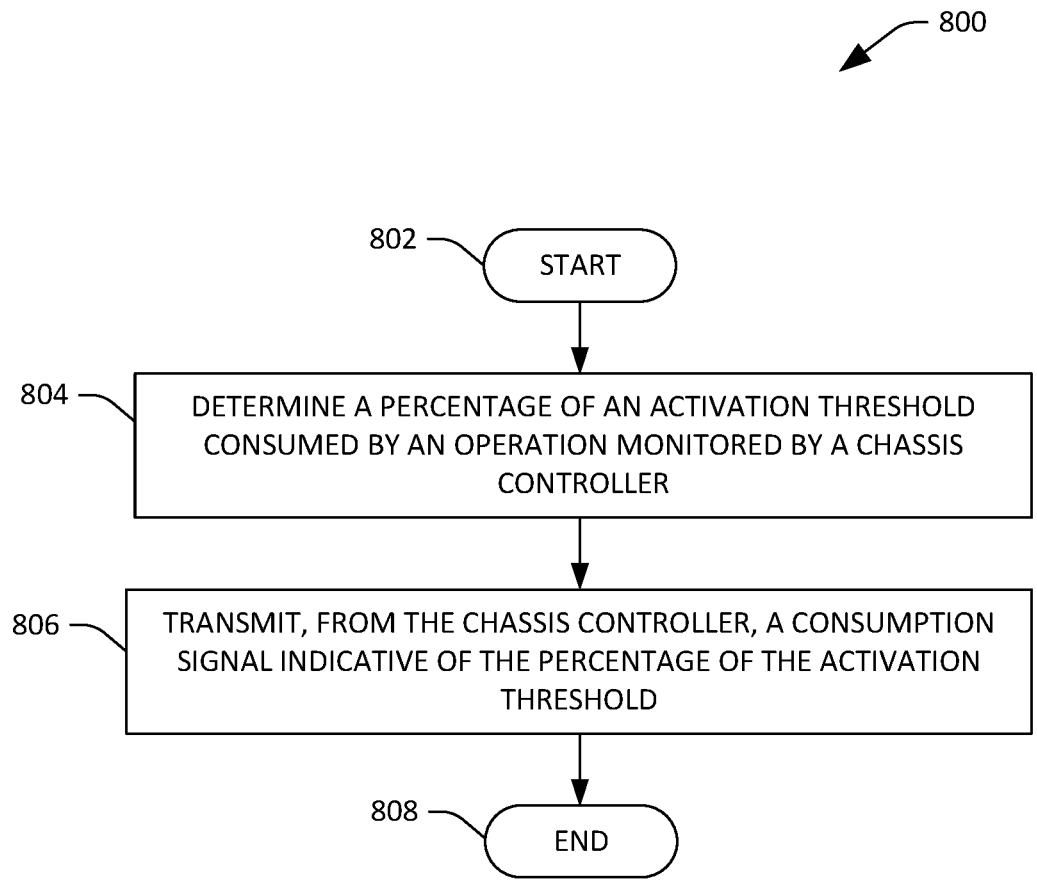
FIG. 8 is a flow diagram illustrating an exemplary methodology for providing a consumption signal from a chassis controller.

FIGS. 7 and 8 illustrate exemplary methodologies relating to preemptive chassis control intervention. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, an exemplary methodology 700 is illustrated for operating an autonomous vehicle having a mechanical system and a chassis controller. The methodology 700 starts at 702, and at 704 a consumption signal generated by a chassis controller is received, for example, by a computing system of the autonomous vehicle in communication with the chassis controller. The consumption signal represents a percentage of an activation threshold consumed by an operation monitored by the chassis controller, wherein the chassis controller is activated to manipulate the mechanical system of the autonomous vehicle when the activation threshold is reached. At 706, a path plan is determined for the autonomous vehicle based upon the percentage of the activation threshold represented in the consumption signal. At 708, the mechanical system of the autonomous vehicle is controlled to execute the path plan. The methodology 700 completes at 710.

Referring now to FIG. 8, an exemplary methodology 800 is illustrated for providing a consumption signal from a chassis controller. The methodology 800 starts at 802, and at 804 a percentage of an activation threshold consumed by an operation monitored by the chassis controller is determined, wherein the chassis controller is activated when the activation threshold is reached. The operation monitored by the chassis controller may be indicative of wheel or vehicle stability. At 806, a consumption signal is transmitted from the chassis controller indicative of the percentage of the activation threshold consumed by the operation monitored by the chassis controller. The consumption signal may be received by a computing system that controls a mechanical system of an autonomous vehicle. The methodology 800 completes at 808.

Figure 9:
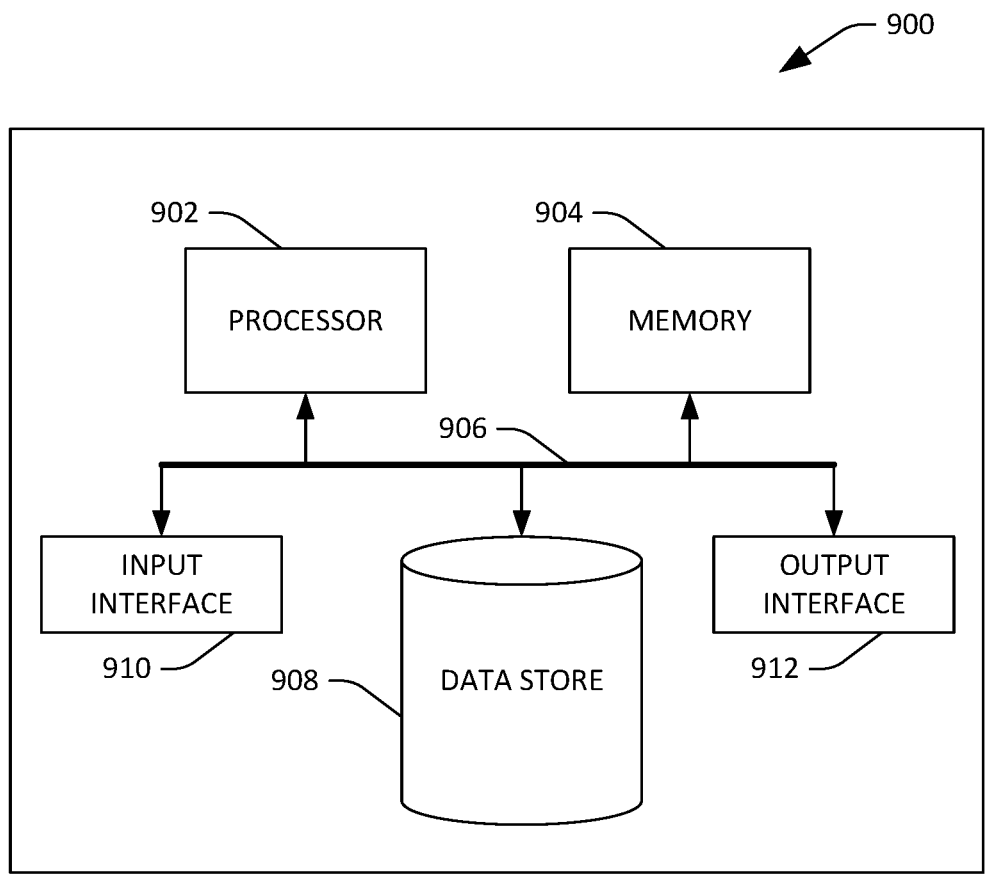
FIG. 9 illustrates an exemplary computing system.

Referring now to FIG. 9, a high-level illustration of an exemplary computing device 900 that can be used in accordance with the systems and methodologies disclosed herein is illustrated. For instance, the computing device 900 may be or include the computing system 112. The computing device 900 includes at least one processor 902 that executes instructions that are stored in a memory 904.

The instructions may be, for instance, instructions for implementing functionality described as being carried out by one or more modules and systems discussed above or instructions for implementing one or more of the methods described above. In addition to storing executable instructions, the memory 904 may also store location information, distance information, direction information, etc.

The computing device 900 additionally includes a data store 908 that is accessible by the processor 902 by way of the system bus 906. The data store 908 may include executable instructions, location information, distance information, direction information, etc. The computing device 900 also includes an input interface 910 that allows external devices to communicate with the computing device 900. For instance, the input interface 910 may be used to receive instructions from an external computer device, etc. The computing device 900 also includes an output interface 912 that interfaces the computing device 900 with one or more external devices. For example, the computing device 900 may transmit control signals to the vehicle propulsion system 106, the braking system 108, and/or the steering system 110 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle, comprising:
   a mechanical system;
   a chassis controller configured to manipulate the mechanical system upon being activated, wherein the chassis controller is activated to manipulate the mechanical system when an activation threshold is reached, wherein the chassis controller is not activated when the activation threshold is not reached, wherein the chassis controller is further configured to output a consumption signal representative of a non-dimensional value indicative of a relationship between a detected value of a parameter monitored by the chassis controller and the activation threshold; and
   a computing system in communication with the mechanical system and the chassis controller, wherein the computing system comprises:
      a processor; and
      memory that stores instructions that, when executed by the processor, cause the processor to perform acts comprising:
         receiving the consumption signal output by the chassis controller;
         determining a path plan for the autonomous vehicle based upon the non-dimensional value indicative of a relationship between the detected value of the parameter monitored by the chassis controller and the activation threshold such that the path plan mitigates a projected activation of the chassis controller; and
         controlling the mechanical system to execute the path plan.

2. The autonomous vehicle of claim 1, wherein the chassis controller is at least one of an antilock braking system controller, a traction control system controller, or an electronic stability control controller.

3. The autonomous vehicle of claim 1, further comprising a controller area network bus, wherein the chassis controller and the computing system communicate via the controller area network bus.

4. The autonomous vehicle of claim 1, wherein the activation threshold is a variable threshold based upon at least one of an environmental condition, a vehicle speed, or traffic congestion.

5. The autonomous vehicle of claim 1, wherein the activation threshold is a variable threshold that is periodically modified by the chassis controller based upon information provided by the computing system.

6. The autonomous vehicle of claim 1, wherein the acts performed by the processor further comprise:
   determining from the consumption signal whether the non-dimensional value exceeds a preemptive action threshold; and
   modifying the path plan at one or more impending timesteps responsive to the preemptive action threshold being exceeded by the non-dimensional value, wherein modification of the path plan causes actuation of the mechanical system at the one or more impending timesteps to be manipulated.

7. The autonomous vehicle of claim 1, wherein controlling the mechanical system to execute the path plan includes manipulating at least one of brake pressure, brake torque, propulsion torque, or steering angle.

8. The autonomous vehicle of claim 1, wherein the chassis controller is at least one of an antilock braking system controller having a first activation threshold, a traction control system controller having a second activation threshold, or an electronic stability control controller having a third activation threshold; and
- wherein the antilock braking system controller is activated when the first activation threshold is reached, the traction control system controller is activated when the second activation threshold is reached, and the electronic stability control controller is activated when the third activation threshold is reached.

9. The autonomous vehicle of claim 1, wherein the acts performed by the processor further comprise:
- receiving data indicative of an actuation force of the mechanical system;
- identifying an increase in the non-dimensional value from the consumption signal, wherein the increase corresponds to a change in the non-dimensional value over time;
- determining a surface friction based upon the change in the non-dimensional value over time and the data indicative of the actuation force of the mechanical system; and
- controlling the mechanical system based upon the surface friction.

10. The autonomous vehicle of claim 1, wherein the consumption signal includes data indicative of a surface friction, and
- wherein the path plan is further determined based upon the data indicative of the surface friction.

11. A method of operating an autonomous vehicle having a mechanical system and a chassis controller, the method comprising:
- receiving a consumption signal outputted by the chassis controller, wherein the consumption signal represents a non-dimensional value indicative of a relationship between a detected value of a parameter monitored by the chassis controller and an activation threshold, wherein the chassis controller manipulates the mechanical system upon being activated, wherein the chassis controller is activated to manipulate the mechanical system when the activation threshold is reached, and wherein the chassis controller is not activated when the activation threshold is not reached;
- determining a path plan for the autonomous vehicle based upon the non-dimensional value indicative of a relationship between the detected value of the parameter monitored by the chassis controller and the activation threshold such that the path plan mitigates a projected activation of the chassis controller; and
- controlling the mechanical system to execute the path plan.

12. The method of claim 11, further comprising representing information in the consumption signal received from at least one of an antilock braking system controller, a traction control system controller, or an electronic stability control controller.

13. The method of claim 11, wherein the consumption signal is received from the chassis controller at a computing system of the autonomous vehicle via a controller area network bus.

14. The method of claim 11, further comprising varying the activation threshold based upon at least one of an environmental condition, a vehicle speed, or traffic congestion.

15. The method of claim 11, further comprising:
- determining from the consumption signal whether the non-dimensional value exceeds a preemptive action threshold; and
- modifying the path plan at one or more impending timesteps responsive to the preemptive action threshold being exceeded by the non-dimensional value, wherein modification of the path plan causes actuation of the mechanical system at the one or more impending timesteps to be manipulated.

16. The method of claim 11, wherein controlling the mechanical system to execute the path plan further comprises manipulating at least one of brake pressure, brake torque, propulsion torque, or steering angle.

17. The method of claim 11, wherein the chassis controller is at least one of an antilock braking system controller having a first activation threshold, a traction control system controller having a second activation threshold, or an electronic stability control controller having a third activation threshold; and
- wherein the antilock braking system controller is activated when the first activation threshold is reached, the traction control system controller is activated when the second activation threshold is reached, and the electronic stability control controller is activated when the third activation threshold is reached.

18. The method of claim 11, further comprising:
- receiving data indicative of an actuation force of the mechanical system;
- identifying an increase in the non-dimensional value from the consumption signal, wherein the increase corresponds to a change in the non-dimensional value over time;
- determining a surface friction based upon the change in the non-dimensional value over time and the data indicative of the actuation force of the mechanical system; and
- controlling the mechanical system based upon the surface friction.

* * * * *